United States Patent
Katsuta

[19]

[11] Patent Number: 5,818,450
[45] Date of Patent: Oct. 6, 1998

[54] METHOD OF DISPLAYING DATA SETTING MENU ON TOUCH INPUT DISPLAY PROVIDED WITH TOUCH-SENSITIVE PANEL AND APPARATUS FOR CARRYING OUT THE SAME METHOD

[75] Inventor: Hiroshi Katsuta, Gotenba, Japan

[73] Assignee: Toshiba Kikai Kabushiki Kaisha, Tokyo, Japan

[21] Appl. No.: 812,648

[22] Filed: Mar. 7, 1997

[30] Foreign Application Priority Data

Mar. 7, 1996 [JP] Japan .................................. 8-050484

[51] Int. Cl.⁶ ....................................................... G06F 3/14
[52] U.S. Cl. ........................... 345/352; 345/173; 345/334
[58] Field of Search .................................... 345/173, 326, 345/333, 334, 352, 353

[56] References Cited

U.S. PATENT DOCUMENTS 5,513,342  4/1996  Leong et al. .............................. 345/340
5,717,439  2/1998  Levine et al. ............................ 345/353

FOREIGN PATENT DOCUMENTS 03350877  12/1991  Japan .
03350878  12/1991  Japan .

OTHER PUBLICATIONS

Cowart, R "Mastering Windows 3.1, Special Edition", pp. 156–157, Subex, 1993.

*Primary Examiner*—Raymond J. Bayerl
*Assistant Examiner*—Chadwick A. Jackson
*Attorney, Agent, or Firm*—Cushman Darby & Cushman IP Group of Pillsbury Madison & Sutro LLP

[57] ABSTRACT

Either a data input key window of step switches type or a data input key window of step numeric keys type is displayed with data item indicating blocks or set value indicating blocks displayed when a touch is made to any one of the data item indicating blocks or the set value indicating blocks according to the selected data input method. If the step switch input method is selected, a value to be set is entered by making touches to increment and decrement keys included in the data input key window. If the numeric key input method is selected, a value is entered by making touches to numeric keys included in the data input key window.

7 Claims, 6 Drawing Sheets

METHOD OF DISPLAYING DATA SETTING MENU ON TOUCH INPUT DISPLAY PROVIDED WITH TOUCH-SENSITIVE PANEL AND APPARATUS FOR CARRYING OUT THE SAME METHOD

BACKGROUND OF THE INVENTION

1. Field of the Invention

The present invention relates to a touch input display useful for entering set data specifying process conditions into a process controller for an injection molding machine or a die casting machine.

2. Description of the Related Art

A process controller is employed in a molding machine, such as an injection molding machine or a die casting machine. The process controller controls molding conditions i.e. a direction, force and speed of a series of actions for mold closing and injection. The process controller is provided with a data setting panel for setting data specifying molding conditions, and data storage unit storing molding condition data collectively.

A data setting panel of a recent process controller adopts a touch input display which is formed by attaching a touch-sensitive panel to the screen of a CRT display. The touch input display is capable of entering set data specifying process conditions and changing set data through the touch-operation on numeric key elements or the like displayed on the screen of the CRT display.

Conventional numerical data input method used in the touch input display are classified into a numeric key input method which enters numerical values by touching numeric key elements displayed on a display, and a step switch input method which increases and decreases numerical values displayed on a display by touching touch-sensitive key elements assigned to each figure by one count at a time. A known touch-sensitive panel apparatus of a numeric key input system is disclosed in, for example, JP-A No. 63-278122. A known touch-sensitive panel apparatus of the step switch input system is disclosed in, for example, JP-A No. 63-278123.

Procedure for setting process conditions by entering data into a process controller include an initial condition setting procedure and a fine adjusting procedure. In the initial condition setting procedure to specify conditions for starting a new process after the change of a mold or a lot, entering data by using a numeric key method occupies major steps of the procedure.

The fine adjusting procedure is a procedure to be conducted occasionally in the course of operations with reference to the quality of moldings and the running conditions of the machine. Adjusting preset numerical values specifying running conditions including a temperature, a pressure, a speed, a position, a time by using the step switch input method occupies major steps of the procedure.

Most conventional touch input displays for process controller adopted as the input method either the numeric key input method or the step switch input method. The touch input display of the numeric key input system is unable to carry out a fine adjusting operation efficiently. The touch input display of the step switch input system is unable to carry out an initial condition setting operation efficiently. Some operators are well experienced in input operations using numeric keys and, other operators are well experienced in input operations using step switches. Due to the fact that the input system can not be customized or modified as desired, the touch input display is not necessarily suitable and not user-friendly for all the operators experienced in different input methods.

SUMMARY OF THE INVENTION

Accordingly, it is an object of the present invention to solve the foregoing problems in the prior art and to provide a method and an apparatus of displaying a data setting menu on a touch input display provided with a touch-sensitive panel, capable of enabling an efficient input operations, and choosing either of the numeric key input method and the step switch input method, desired by the operator according to the condition of the data setting environment.

With the foregoing object in view, the present invention provides a method of displaying a data setting menu having a plurality of indicating blocks on a touch input display provided with a transparent touch-sensitive panel with touch input key elements arranged so as to overlap the indicating blocks displayed on the screen of the touch input display, the indicating block including data item indicating blocks for indicating data items and set value indicating blocks which to display set values for the data items, the touch input key elements being touched on a surface of the transparent touch-sensitive panel, said method comprising steps of:
choosing a data input method for setting value for the data item between a step switch input method and a numeric key input method by touching a touch input key element for selecting a input method;

displaying either a data input key window of step switches type or a data input key window of numeric keys type according to the selected data input method, with a data item indicating block and/or a set value indicating block displayed, when a touch is made to the data item indicating block or the set value indicating block in which a set value is entered or changed; and entering the set value by making touches to increment keys and decrement keys included in the data input key window of step switches type or numeric keys included in the data input key window of numeric keys type.

It is preferable to display the data input key window of step switches type displays an input data indicating block for indicating a set value of at least two digits, increment keys disposed directly above the digits in the input data indicating block for increasing the values of the corresponding digits, and decrement keys disposed directly below the digits in the input data indicating block for decreasing the values of the corresponding digits;

the data input key window of numeric keys type displays an input data indicating block for indicating a set value of at least two digits, and numeric keys for specifying data to be indicated in the input data indicating block.

It is preferable to display the data input key window of step switches type or the data input key window of numeric keys type is displayed in a region formed by deleting the data item indicating blocks or the set value indicating blocks other than the selected data item indicating block or the selected set value indicating block, with the selected data item indicating block or the selected set value indicating block displayed.

Furthermore, the present invention provides an apparatus for carrying out the method of displaying a data setting menu on a touch input display comprising:

an input method choosing means for choosing a data input method for setting value for the data item between a step switch input method and a numeric key input method;

an input method deciding means for deciding the selected input method when a touch is made to any one of the data item indicating block or the set value indicating block;

an displaying means for displaying either a data input key window of step switches type or a data input key window of numeric keys type, with the data item indicating block in which a set value is entered or changed and/or a set value indicating block displayed; and a touch input means corresponding to increment keys and decrement keys included in the data input key window of step switches type and/or numeric keys included in the data input key window of numeric keys type.

According to the present invention, the data items indicating blocks for setting initial condition includes a touch input key element for choosing a data input mode.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

A man-machine interface unit of a process controller for an injection molding machine in a preferred embodiment of the present invention will be described with reference to the accompanying drawings.

Figure 1:
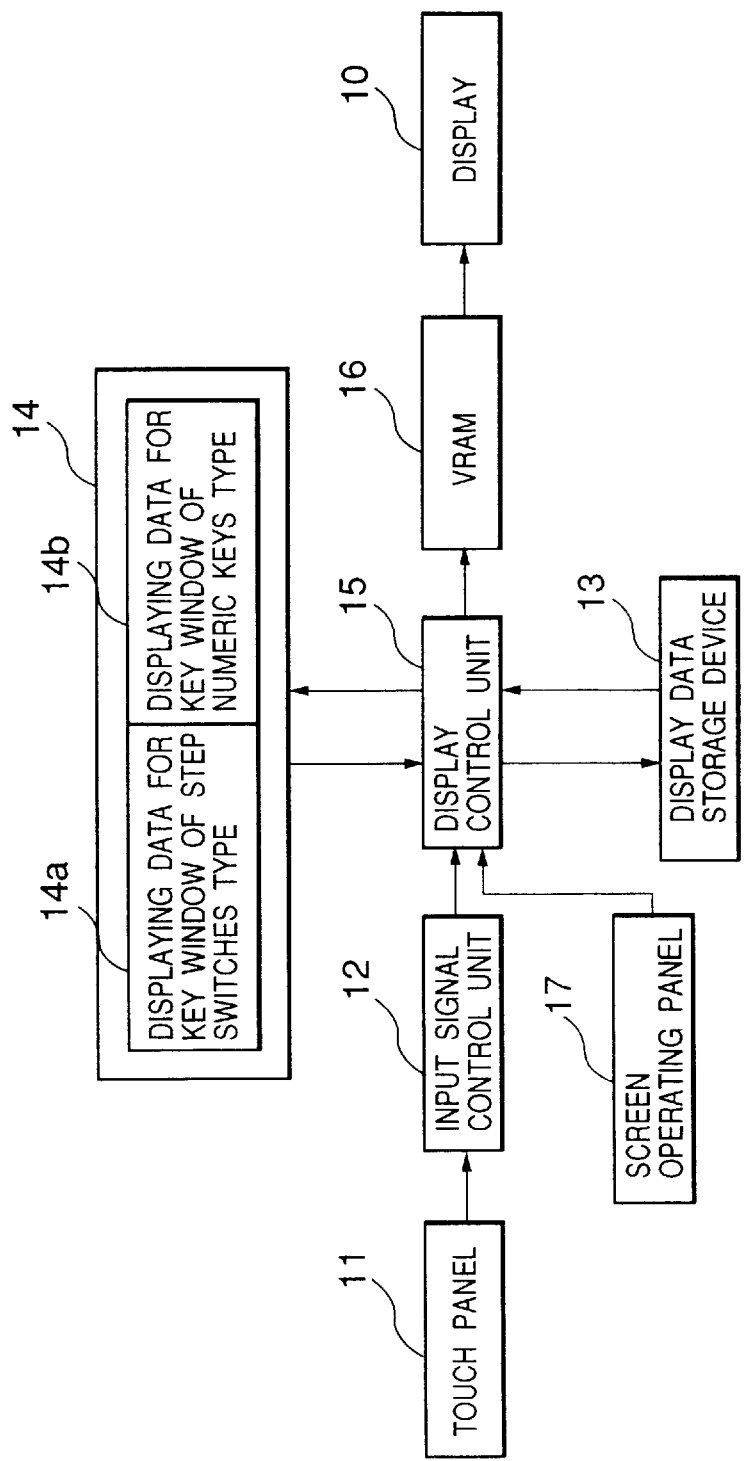
FIG. 1 is a block diagram of a man-machine interface included in a touch input display to be operated by touch operations for carrying out a method of displaying a data setting menu in a preferred embodiment according to the present invention.

Referring to FIG. 1, the man-machine interface unit has a display unit provided in its front surface with a display 10, such as a CRT display or a liquid crystal display. A transparent touch panel 11 is attached to the screen of the display 10. The touch panel 11 may be of a known system for detecting a position on the surface thereof touched with a finger, such as a capacitance system, an optical system or a resistance sheet system.

An input signal control unit 12 receives signals from the touch panel 11 and transfers touched positions on the screen to the display control unit 15.

A first display data storage device 13 stores data to be displayed on the screen of the display 10, such as data items for a data setting menu, and set values. A second display data storage device 14 stores segment data, concretely an input key window to be displayed on the screen of the display 10 during operations of entering data of molding condition, etc. Data 14a as a data input key window of step switches type and data 14b as a data input key window of numeric keys type are stored in the second display data storage device 14.

When the touch panel 11 is touched by a operator, a display control unit 15 executes necessary operation processing on the basis of position information provided by the touch panel 11. The display control unit 15 reads data from the first display data storage device 13 and the second display data storage device 14 in response to a request delivered from a screen operating panel 17 included in the display unit, and transfers the data to a VRAM 16. The screen operating panel 17 will be mentioned latter.

Figure 2:
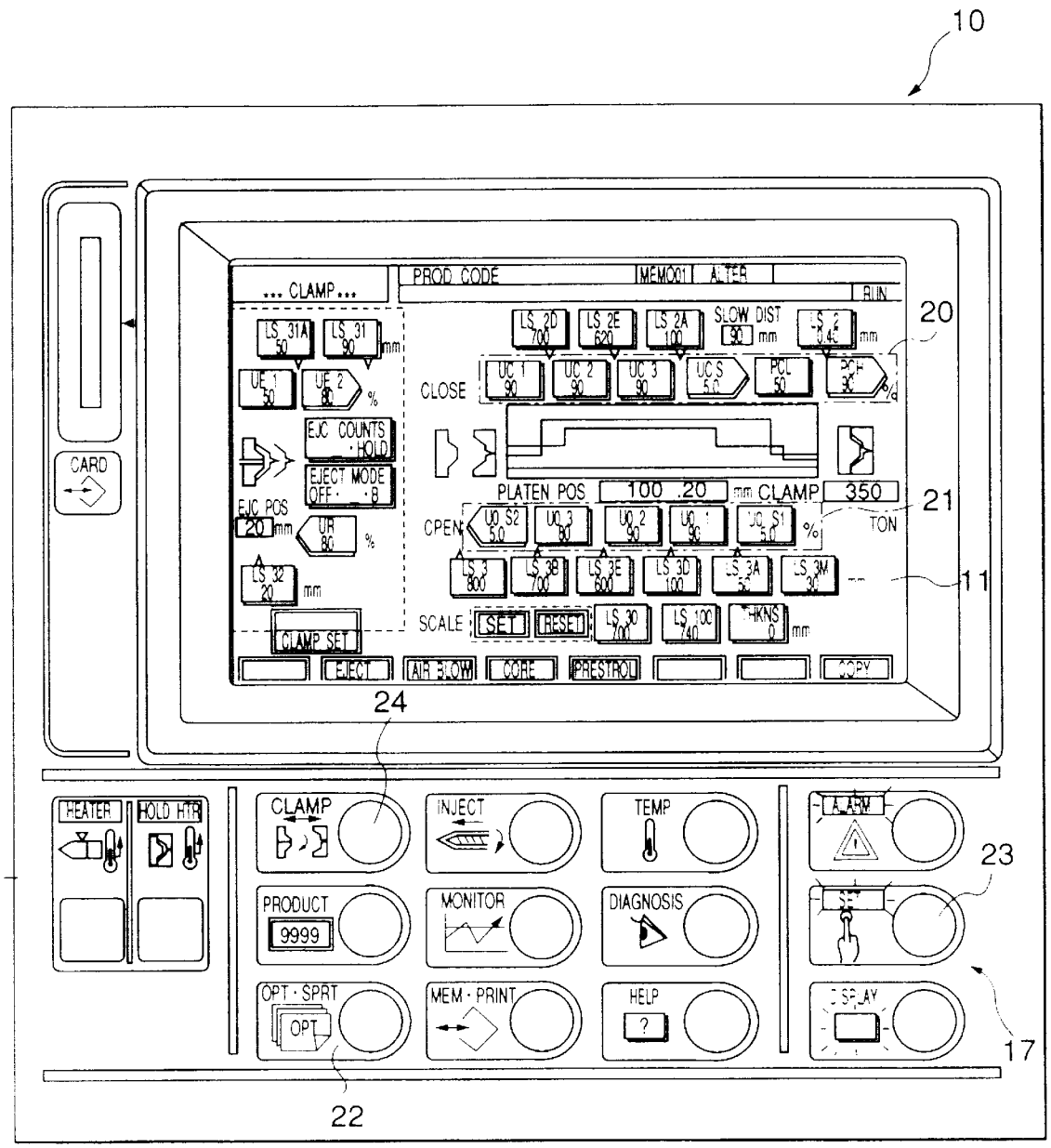
FIG. 2 is a front view of the touch input display employed in carrying out the foregoing embodiment of the present invention.

Referring to FIG. 2 showing the front surface of the display unit of the process controller, the touch panel 11 is attached to the screen of the display 10. Data items included in the data setting menu displayed on the screen of the display 10 can be seen through the touch panel 11. Shown in FIG. 2, for example, is a mold opening and closing speed setting menu, which is one of the data setting menus for setting various molding conditions including injection speed, injection pressure, screw speed, screw back pressure, mold opening and closing speed, and barrel heater temperature. Sections enclosed by chain lines are a mold closing speed indicating block 20, and a mold opening speed indicating block 21. Mold closing/opening speeds for different positions of a movable platen are set respectively in the mold closing speed indicating block 20 and the mold opening speed indicating block 21 in which the data item and the values are indicated.

The screen operating panel 17 is disposed under the display 10. The screen operating panel 17 is provided with data setting menu selecting buttons.

Figure 3:
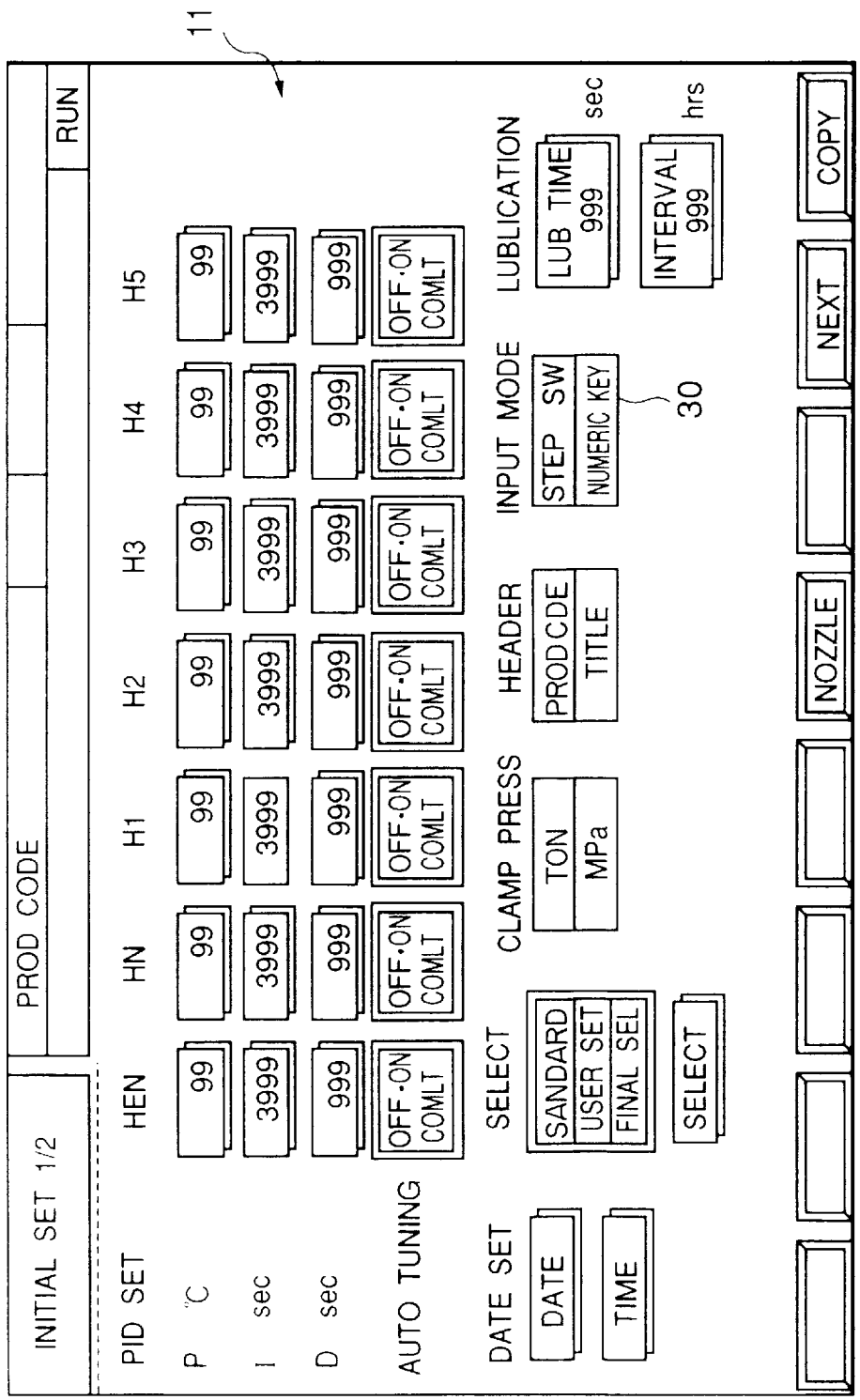
FIG. 3 is a view of a screen displaying an initial data setting menu.

FIG. 3 shows an initial data setting menu for the process controller. In this initial data setting menu, values for parameters of the PID control of the temperature of a barrel heater can be set, and other data setting menu can be chosen by a touch input operation. In the initial data setting menu, a touch-sensitive input key element marked with "INPUT MODE" is an input method selector key 30 for selecting either a step switch input method or a numeric key input method.

The data setting menu can switch from the one shown in FIG. 2 to the other shown in FIG. 3 by pressing an option support button 22 and a set button 23.

Figure 4:
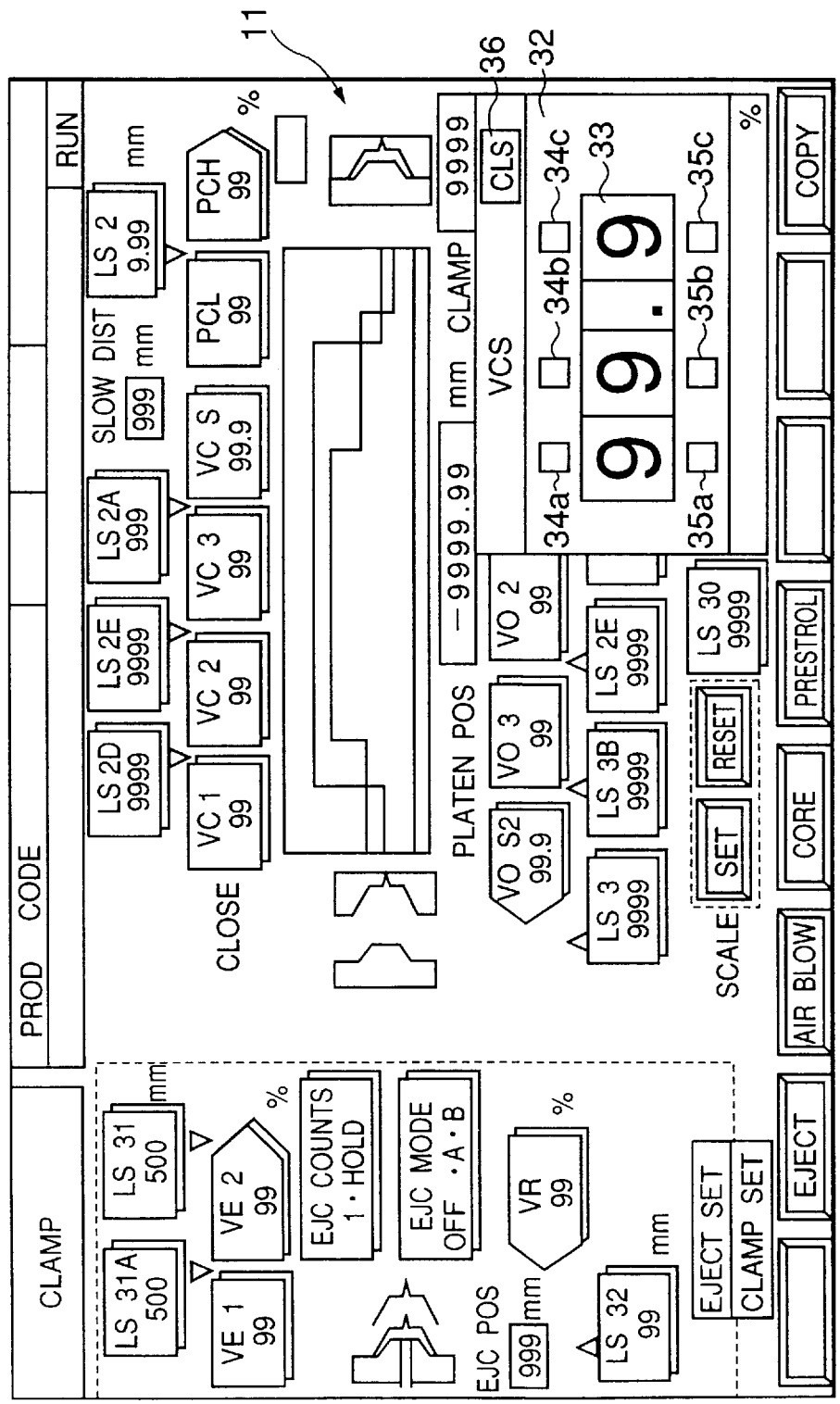
FIG. 4 is a view of a screen displaying a data setting menu in which a data input key window of step switches type is opened.
Figure 5:
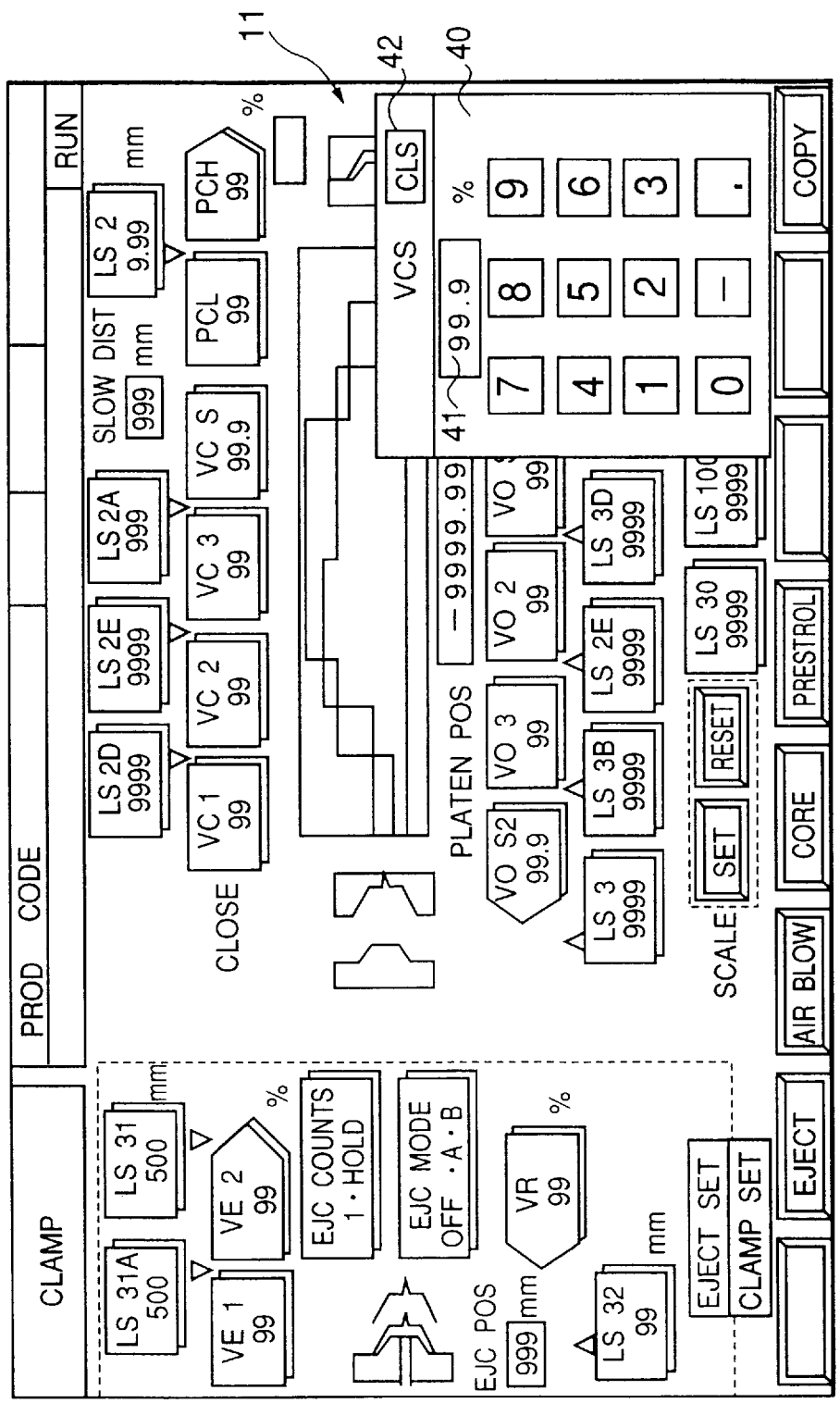
FIG. 5 is a view of a screen displaying a data setting menu in which a data setting key window of numeric key type is opened.
Figure 6:
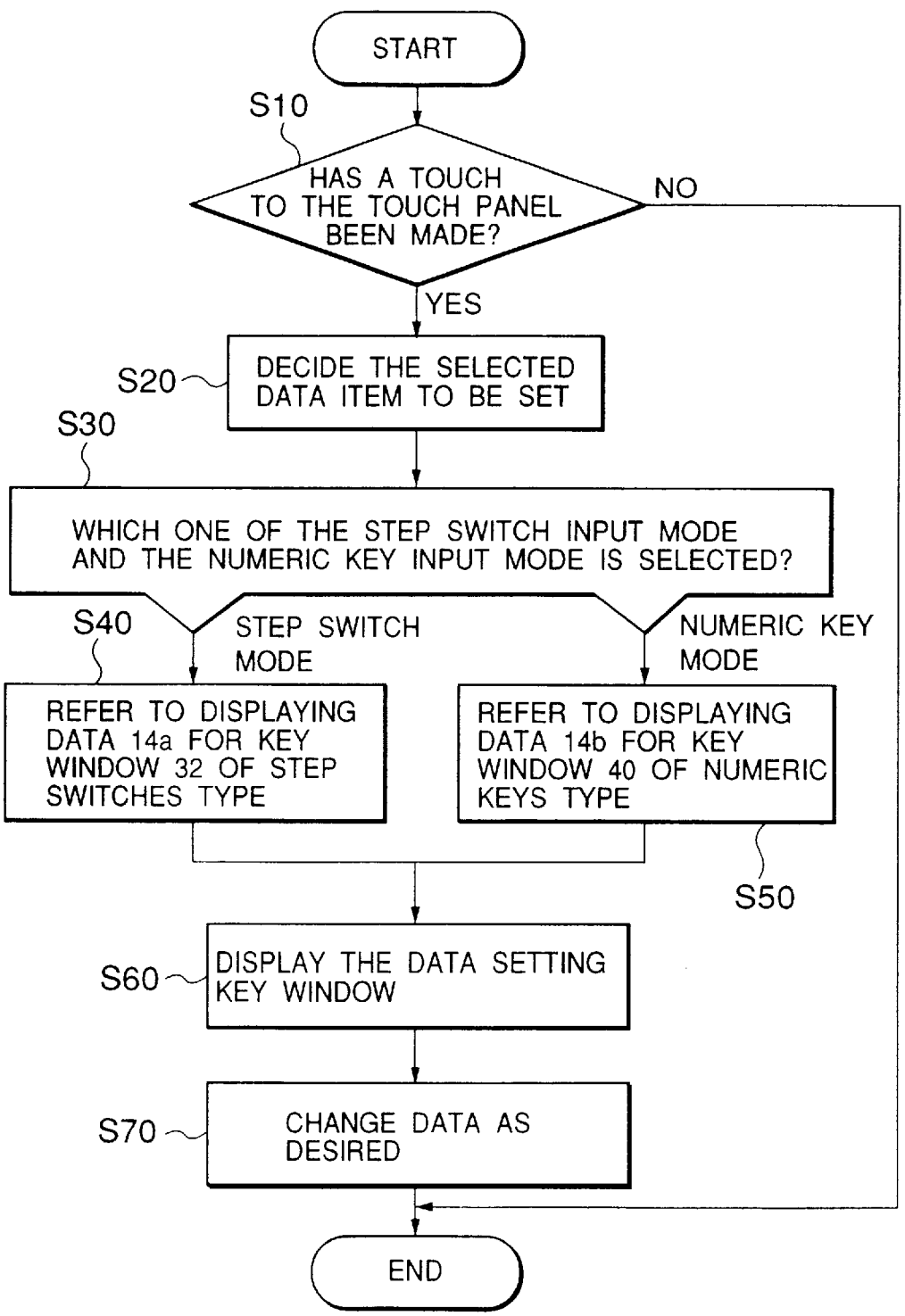
FIG. 6 is a flow chart of a data setting menu displaying procedure in accordance with the present invention.

FIG. 6 is a flowchart of a data setting menu regenerating procedure in accordance with the present invention. A procedure of setting data of molding conditions will more specifically be described with reference to FIG. 4 and FIG. 5. FIG. 4 is showing a data setting menu for entering data by using the step switch input method and FIG. 5 showing a data setting menu for entering data by using the numeric key input method.

Shown in FIGS. 4 and 5 are data setting menus for setting a mold closing speed and a mold opening speed. These data setting menus appear when a CLAMP button 24 in the screen operating panel 17 is pressed.

Referring to FIG. 4, when the operator touches the touch panel 11 at a position corresponding to a mold closing speed setting block VC1 among mold closing speed setting blocks VC1, VC2, VC3 and VCS (response in step S10 is affirmative), it is decided that a set value for the touched mold closing speed VCS among others is to be changed (step S20).

Subsequently, a query is made in step S30 to see which one of the step switch input mode and the numeric key input mode is selected by the input method selector key 30 included in the data setting menu shown in FIG. 3.

If the input method goes into the step switch input method is chosen in step S30, the display control unit 15 reads data 14a as a data input key window of step switches type and transfers the data to the VRAM 16 in step S40. Consequently, a data input key window 32 of step switches type shown in FIG. 4 is displayed on the screen of the display 10 in step S60. The data input key window 32 of step switches type appears in a region in which other than the data item to be changed are deleted in the data setting menu. As shown in FIG. 4, the data input key window 32 of step switches type appears in a location apart for the data item VCS.

The data input key window 32 includes an input data indicating block 33 in which a value with three digits can be indicated to one place of a decimal, decrement keys 34a, 34b and 34c displayed directly above the digits to decrease the corresponding digits one at a time, increment keys 35a, 35b and 35c displayed directly below the digits to increase the corresponding digits one at a time, and a data input key 36 for deciding and entering a value.

A previously set value is indicated in the input data indicating block 33 upon the opening of the data input key window 32. The previously set value is changed by making touches to the decrement keys 34a to 34c and the increment keys 35a to 35c. After the values are changed, a touch is made to the data input key 36 to replace the previously set value with the new mold closing speed VCS in step S70.

If the numeric key input method is selected in step S30, the display control unit 15 reads displaying data 14b as a data input key window of numeric keys type and transfers the data to the VRAM 16 in step S50. Consequently, a data input key window 40 of numeric keys type shown in FIG. 5 is displayed on the screen of the display 10 in step S60. The data input key window 40, similarly to the data input key window 32, appears in a region in which other than the data item to be changed are deleted in the data setting menu. As shown in FIG. 5, the data input key window 40 of numeric keys type appears in a location apart for the data item VCS.

The data input key window of numeric keys type 40 includes an input data indicating block 41 in which a value with three digits can be indicated to one place of a decimal, a numeric keypad including 0 to 9 numeric keys, a minus key and a period key, and a data input key 42 for deciding and entering a value.

After the data setting key window 40 has been opened, A value specified by making touches to the numeric keys are indicated in the input data indicating block 41. The value thus specified is set as a new mold closing speed VCS by making a touch to the data input key 42 in step S70.

A touch-input operation using the input method selection key 30 enable a operator to select the data input mode for which is the operator's preference or suitable for setting a value for the desired molding condition setting item. Thus, a desired data setting window in which the operator uses the desired data input method, i.e., either the step switch input method or the numeric key input method, can be opened by making a touch to a desired molding condition setting item. Consequently, the data setting operation can efficiently be accomplished.

As is apparent from the foregoing description, according to the present invention, if operations for entering values to set initial conditions are principal operations, the operator can select numeric key input method. if operations for increasing or decreasing previously set values to adjust the molding conditions are principal operations, the operator can select the step switch input method. If the operator select either the numeric key input method or step switch input method in advance, a data input key window with a desired input key element can be opened on the screen by simply making a touch to the desired data item indicating block. Accordingly, the data setting operation can efficiently be accomplished.

Although the invention has been described in its preferred form with a certain degree of particularity, obviously many changes and variations are possible therein. It is therefore to be understood that the present invention may be practiced otherwise than as specifically described herein without departing from the scope and the spirit thereof.

What is claimed is:

1. A method of displaying a data setting menu having a plurality of indicating blocks on a touch input display provided with a transparent touch-sensitive panel with touch input key elements arranged so as to overlap the indicating blocks displayed on the screen of the touch input display, the indicating block including data item indicating blocks for indicating data items and set value indicating blocks which display set values for the data items, the touch input key elements being touched on a surface of the transparent touch-sensitive panel, said method comprising steps of:
choosing a data input method for setting value for the data item between a step switch input method and a numeric key input method by touching a touch input key element for selecting a input method;
displaying either a data input key window of step switches type or a data input key window of numeric keys type according to the selected data input method, with a data item indicating block and/or a set value indicating block displayed, when a touch is made to the data item indicating block or the set value indicating block in which a set value is entered or changed; and
entering the set value by making touches to increment keys and decrement keys included in the data input key window of step switches type or numeric keys included in the data input key window of numeric keys type.

2. The method of displaying a data setting menu on a touch input display provided with a transparent touch-sensitive panel according to claim 1, wherein;
the data input key window of step switches type displays an input data indicating block for indicating a set value of at least two digits, increment keys disposed directly above the digits in the input data indicating block for increasing the values of the corresponding digits, and decrement keys disposed directly below the digits in the input data indicating block for decreasing the values of the corresponding digits;
the data input key window of numeric keys type displays an input data indicating block for indicating a set value of at least two digits, and numeric keys for specifying data to be indicated in the input data indicating block.

3. The method of displaying a data setting menu on a touch input display provided with a transparent touch-sensitive panel according to claim 1, wherein the data input key window of step switches type or the data input key window of numeric keys type is displayed in a region formed by deleting the data item indicating blocks or the set value indicating blocks other than the selected data item indicating block or the selected set value indicating block, with the selected data item indicating block or the selected set value indicating block displayed.

4. An apparatus for displaying a data setting menu having a plurality of indicating blocks on a touch input display provided with a transparent touch-sensitive panel with touch input key elements arranged so as to overlap the indicating blocks displayed on the screen of the touch input display, the indicating block including data item indicating blocks for indicating data items and set value indicating blocks which display set values for the data items, the touch input key elements being touched on a surface of the transparent touch-sensitive panel, said apparatus comprising:
an input method choosing means for choosing a data input method for setting value for the data item between a step switch input method and a numeric key input method;
an input method deciding means for deciding the selected input method when a touch is made to any one of the data item indicating block or the set value indicating block;
an displaying means for displaying either a data input key window of step switches type or a data input key window of numeric keys type, with the data item indicating block in which a set value is entered or changed and/or a set value indicating block displayed; and
a touch input means corresponding to increment keys and decrement keys included in the data input key window of step switches type and/or numeric keys included in the data input key window of numeric keys type.

5. The apparatus for displaying a data setting menu on a touch input display provided with a transparent touch-sensitive panel according to claim 4, wherein;
the displaying means is displaying
the data input key window of step switches type includes an input data indicating block for indicating a set value of at least two digits, increment keys disposed directly above the digits in the input data indicating block for increasing the values of the corresponding digits, and decrement keys disposed directly below the digits in the input data indicating block for decreasing the values of the corresponding digits or;
the data input key window of numeric keys type includes an input data indicating block for indicating a set value of at least two digits, and numeric keys for specifying data to be indicated in the input data indicating block on the screen of the touch input display.

6. The apparatus for displaying a data setting menu on a touch input display provided with a transparent touch-sensitive panel according to claim 5, wherein the displaying means comprises a touch input display for a process controller for an injection molding machine, the data setting menu including items necessary for setting initial conditions and molding conditions for an injection molding machine.

7. The apparatus for displaying a data setting menu on a touch input display provided with a transparent touch-sensitive panel according to claim 7, wherein the data setting menu for setting initial condition includes a touch input key element for selecting a data input method.

* * * * *